United States Patent [19]

Winston

[11] 3,957,031

[45] May 18, 1976

[54] LIGHT COLLECTORS IN CYLINDRICAL GEOMETRY

[75] Inventor: Roland Winston, Chicago, Ill.

[73] Assignee: The United States of America as represented by the United States Energy Research and Development Administration, Washington, D.C.

[22] Filed: May 29, 1975

[21] Appl. No.: 581,613

[52] U.S. Cl. .............................. 126/270; 350/293
[51] Int. Cl.[2] ....................... F24J 3/02; G02B 5/10
[58] Field of Search ............ 126/270, 271; 350/288, 350/293, 294

[56] References Cited
UNITED STATES PATENTS

| | | | |
|---|---|---|---|
| 980,505 | 1/1911 | Emmet | 126/271 |
| 3,817,605 | 6/1974 | Franklin et al. | 350/288 |
| 3,899,672 | 8/1975 | Levi-Setti | 350/293 |

*Primary Examiner*—Kenneth W. Sprague
*Attorney, Agent, or Firm*—Dean E. Carlson; Arthur A. Churm; Paul A. Gottlieb

[57] ABSTRACT

A device is provided for collecting electromagnetic energy developed by an energy source of finite dimension and of finite distance from the collection device. It includes an energy absorber positioned between two side walls which reflects substantially all incident energy received from the energy source onto the energy absorber.

8 Claims, 3 Drawing Figures

LIGHT COLLECTORS IN CYLINDRICAL GEOMETRY

CONTRACTUAL ORIGIN OF THE INVENTION

The invention described herein was made in the course of, or under, a contract wth the UNITED STATES ENERGY RESEARCH AND DEVELOPMENT ADMINISTRATION.

BACKGROUND OF THE INVENTION

The present invention relates generally to electromagnetic energy collection and more particularly to devices useful in the collection and utilization of energy emanating from a source of finite dimension and finite distance from the collection device, wherein the collection device is a nonimaging cylindrical type collector. For example, a secondary solar energy collector is a device which is positioned to receive energy reflected by a primary collector. The primary collector, which is of fixed dimension and fixed distance from the secondary collector can be considered as a source of electromagnetic energy. Prior art secondary collectors have not provided side wall shapes capable of reflecting all incident energy from the primary source onto the body of a smoothly shaped energy absorber, but rather require extended fins and protrusions to capture all of the desired energy. Further, the prior art schemes do not provide a satisfactory solution for secondary collector design where it is desirable to position the secondary collector asymmetrically disposed with respect to the light source.

The inventor, in a prior U.S. application for Radiant Energy Collector, Ser. No. 492,074, filed July 25, 1974, and in a publication, *Solar Energy*, Vol. 16, No. 2, pages 89–95, (1974) has shown designs for nonimaging collectors. In these disclosures, however, the inventor has been dealing with an energy source, such as the sun, which is considered to be at an infinite distance from the collector so that all light rays incident from the infinite energy source on the collector are considered to be parallel and, further, that the collector itself is assumed to be aligned symmetrically with respect to the envelope containing the incoming rays.

It is therefore an object of this invention to provide a device for efficiently collecting and concentrating radiant energy.

Another object of this invention is to provide a nonimaging energy collection device for collecting energy from a source of finite dimension and finite distance from the collection device.

Another object of this invention is to provide a nonimaging energy collection device positioned asymmetrically with respect to an energy source of finite dimension and finite distance from the collector.

SUMMARY OF THE INVENTION

An electromagnetic energy collection device is provided for collecting energy from a source of finite dimension and finite distance from the collector. It includes a convex energy absorber bounded by a first reference axis and having a second reference axis therethrough and being positioned between two side walls on either side of the second axis which reflect substantially all energy directly onto the energy absorber. Each side wall begins at a tangent point along the first axis where a line from the conjugate edge of the energy source is tangent with the absorber and is so shaped that all energy directed from the conjugate edge of the energy source intersecting the axis of the absorber at any angle, and striking any point on the wall, is directed along a line tangent to the energy receiver. Each wall extends no more than to a line from the second edge of the energy source, conjugate to the other side wall, to a point of tangency with the energy absorber along the first axis.

DETAILED DESCRIPTION OF THE INVENTION

Figure 1:
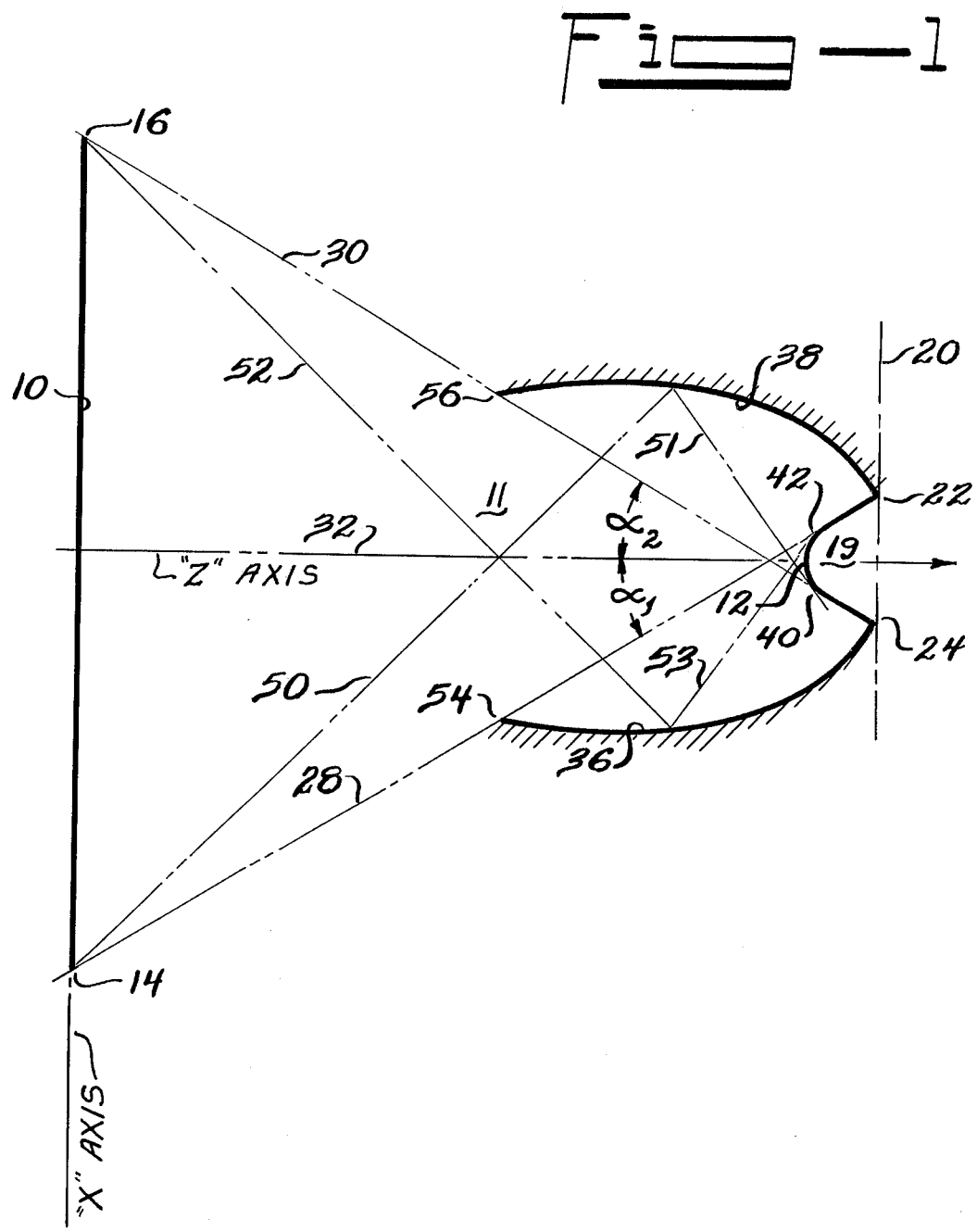
FIG. 1 shows the cross section of the invention with an energy absorber symmetrically disposed with respect to the energy source.

Referring to FIG. 1, there is shown the transverse cross section of the cylindrical electromagnetic energy concentration and collection device of one embodiment of this invention. As the disclosed device is a cylindrical collector, the physical structure of the collector is formed by extending the cross section shown in FIG. 1 along an axis perpendicular to the plane of the cross section to form a trough-like structure, as will be described with reference to FIG. 3. The function of the collector device is to concentrate light from source 10 which impinges on entrance aperture 11 onto the surface of an energy absorber 12. The energy absorber 12 may be, for example, a pipe containing fluid, a photovoltaic cell, or any other type of energy receiver responsive to radiant energy. Source 10 is of finite dimension defined by edge points 14 and 16 and is of finite distance from the absorber 12. In the embodiment shown in FIG. 1, the absorber 12 is symmetrically disposed with respect to source 10.

For a given cross section of an energy absorber 12, the present disclosure deals with developing the contour of side walls for reflecting energy incident on the side walls onto that portion 19 of the cross section of the absorber 12 which lies between axis 20 and light source 10. The portion 19 is limited to being convex so that any line tangent to the perimeter of portion 19 does not cross the perimeter of portion 19 of absorber 12. Note, that a convex portion 19 also includes within its definition a flat plane absorber along axis 20. Axis 20 is a line connecting tangent points 22 and 24. Tangent points 22 and 24 are determined by tangent lines 28 and 30, respectively. Each tangent line extends from an edge point 14 or 16 of source 10, intersecting axis 32 of the porton 19. Axis 32 is a reference axis perpendicular to axis 20 and passes through portion 19. Each tangent line extending from an edge point 14 or 16 intersects the conjugate tangent point 22 or 24 along the perimeter of absorber 12 and is tangent to the absorber 12 along axis 20 at the tangent point. Another way of describing tangent lines 28 and 30 is that the angles $\alpha_1$ or $\alpha_2$ each line makes when intersecting axis 32 is the minimal angle for a line from an edge point tangent to the perimeter of portion 19 without crossing the boundary of portion 19.

Side walls 36 and 38 which are of a material capable of reflecting radiant energy have shapes generated by choosing contours such that singly reflected rays originating from the conjugate edge points 14 or 16 are tangent to the perimeter of portion 19. Thus ray 50 from edge point 14 is directed by wall 38 along line 51 to be tangent to portion 19 and likewise ray 52 is directed by wall 36 along line 53 to be tangent to portion 19. The contour is terminated by the intersection of the wall with the tangent line at points 54 and 56 for walls 36 and 38, respectively. Note that in FIG. 1, the perimeter of portion 19 is extended away from source 10 along tangent lines 28 and 30 from points 40 and 42. The tangent lines 28 and 30 will remain unchanged no matter how far the extension is made from the initial points of tangency 40 and 42, although the contour of walls 36 and 38 will vary depending upon the actual length of the perimeter of portion 19.

Note that the solution herein disclosed differs from that shown in prior disclosures of the inventor previously referred to, in that in those cases, since the source was considered to be of infinite distance from the collector, the side wall contour was determined by the condition that all energy crossing the axis 32 at the maximum acceptance angle and striking any point on the contour of the side wall was directed along a line tangent to the absorber. In this case, only light directed from the edge of the light source which may cross axis 32 at any angle and which is incident on a side wall is directed along a line tangent to absorber 12. The method herein disclosed for developing the side wall contours is not limited to absorbers which have only a portion 19. For cross sections on the opposite side of axis 20 from portion 19, the principle of the involute second portion of a side wall described in U.S. application Ser. No. 492,074 is applicable. FIG. 1 illustrates an absorber aligned symmetrically with respect to the light source. With the special case of a flat receiver, the contour of each side wall is an ellipse with the foci at the conjugate point of tangency and at the conjugate edge point of the light source. Thus, if in FIG. 1 the perimeter of portion 19 was a flat plane along axis 20, point 22 and point 16 would be the foci of a ellipse which would be the contour of wall 36.

Figure 2:
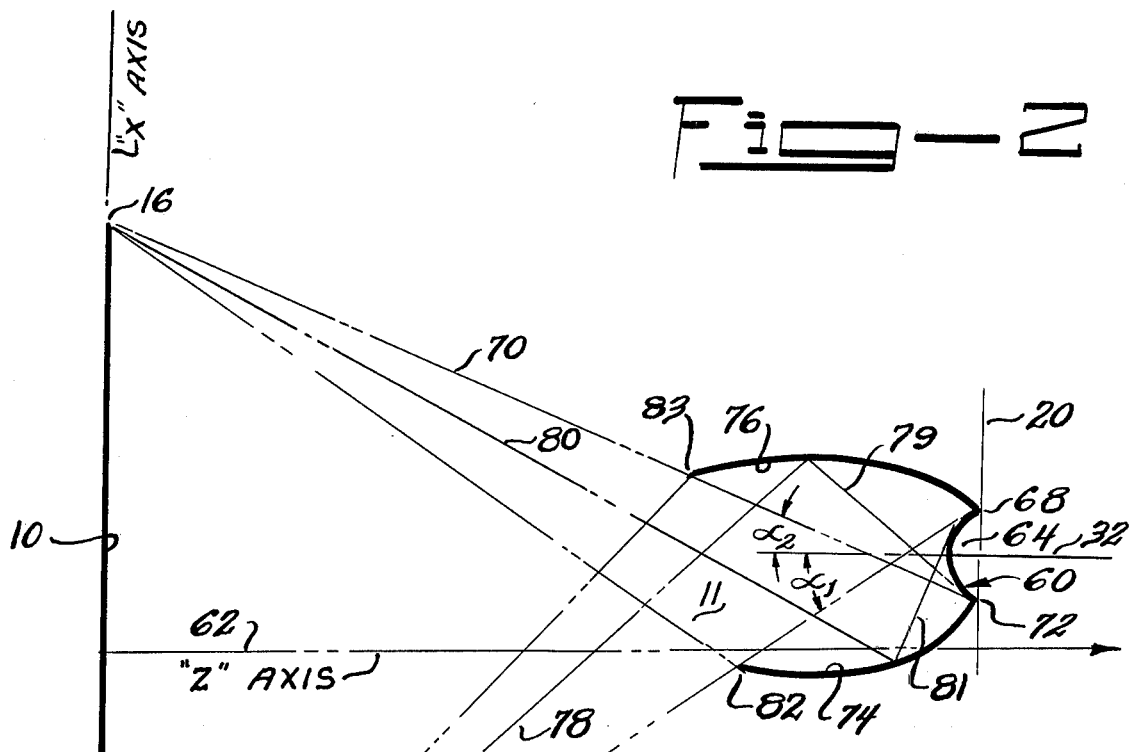
FIG. 2 shows the cross section of the invention with the energy absorber asymmetrically disposed with respect to the energy source.

Referring to FIG. 2, there is shown an absorber 60 which is asymmetrically disposed with respect to light source 10. By asymmetric is meant that a central line 62 passing through source 10 does not pass centrally through portion 19. The same limitations as to the contour of portion 64 as described for portion 19 apply. Thus, portion 64 is convex with respect to axis 20. Tangent line 66 extends from edge point 14 to conjugate tangent point 68, intersecting axis 32 at an angle $\alpha_1$, line 66 being the line with the smallest angle $\alpha_1$ tangent to portion 64 without crossing the boundary of portion 64. Tangent line 70 extends from edge point 16 to conjugate tangent point 72, intersecting axis 32 at an angle $\alpha_2$, line 70 being the line with the smallest angle $\alpha_2$ tangent to portion 64 without crossing the boundary of portion 64. Note that since portion 64 need not have symmetry, axis 32 is merely a reference axis perpendicular to axis 20 passing through portion 64. The contour of each side wall 74 and 76 is determined so that singly reflected rays from edge points 14 and 16 intersecting axis 32 at any angle are directed by the wall upon which they are incident in a line tangent to the perimeter of portion 64. Thus, ray 78 from point 14 is directed by wall 76 along line 79 tangent to portion 64 and ray 80 from point 16 is directed by wall 74 along line 81 tangent to portion 64. Each wall 74 and 76 terminates at the point of intersection with tangent line 66 or 70, points 82 and 83, respectively.

The solutions presented for collecting energy from sources of finite dimension and finite distance for the collectors are developed by applying the principle that all energy trajectories originating outside the source are excluded from reaching the energy absorber. We seek to collect all radiation from the source which impinges on the entrance aperture of the collector and concentrate it onto the absorber. Moreover, we wish to minimize the length S of the perimeter of the portion of the absorber. We treat, in the initial example shown in FIG. 1, a system that is symmetric about the axis 32 ($z$). It is first necessary to establish the maximum possible concentration, i.e., the minimum value of S. This is conveniently done by using a hamiltonian description of the ray trajectories propagating in the $z$ direction. Introducing the direction cosine of the ray $k_x$ conjugate to $x$, the conserved phase space is given by $$\int dx dk_x \text{ is conserved}.$$

$$z = \text{constant}$$
1

Evaluating the phase space at the entrance aperture we obtain the simple result $$\tfrac{1}{2} \int dx dk_x = (q - p)$$
2 where $q$ is the distance from an edge point to its conjugate wall termination point, e.g. from point 14 to point 56, and $p$ is the distance from an edge point to its non-conjugate wall termination point, e.g. from point 14 to point 54. Thus $(q - p)$ is the difference in distance between an edge of the source and the edges of the entrance aperture. Equivalently, this is the difference in distance between an edge of entrance aperture and the edges of the source.

To achieve maximal concentration it is necessary to exclude stray light trajectories originating outside the source from reaching the receiver. In FIG. 1, we therefore require the profile curve of the portion 19 to be tangent to the extreme directions, i.e. lines 28 and 30, at points 22 and 24, respectively. Since portion 19 is convex with respect to axis 20, a tangent to portion 19 is prevented from crossing the portion boundary. The solution to obtaining maximal concentration is to so choose the profile curve of side wall 36 that singly reflected rays originating from edge point 16 are tangent to portion 19 and to so choose the profile curve of side wall 38 that singly reflected rays originating from edge point 14 are tangent to portion 19. This means portion 19 becomes the envelope of such rays. In other words, the perimeter of portion 19 is a caustic surface. If we denote the ray distance from edge point 14 to conjugate wall 38, e.g. line 50, by l and from wall 38 to the conjugate point of tangency on the caustic, e.g. line 51, by $r$ and the arc length along the caustic by $s$, our solution imposes a specific relation between these quantities as follows $$d(l + r) = ds$$
3

Integrating Eq. 3 over the profile curve of wall 38, we obtain $$S = \int_{p.22}^{pt. 56} d(l + r) = (q + r_{pt.\ 56}) - (p + r_{pt.\ 54}) = (q - p)$$
4 demonstrating that our solution indeed minimizes the absorber perimeter S consistent with phase space conservation.

The solution shown for FIG. 1 can be readily adapted to a variety of less restrictive assumptions about the relationship of source to absorber. In FIG. 2 we have permitted the receiver to be asymmetrically disposed relative to the source. For this case, the phase space at the entrance aperture becomes $$\tfrac{1}{2}\int dxdk_r = \tfrac{1}{2}[(q-p)+(n-m)] \qquad 5$$

where $q$ is the distance from one edge point 14 to its conjugate wall termination point 83, $p$ is the distance from edge point 14 to its nonconjugate wall termination point 82, $n$ is the distance from the other edge point 16 to its conjugate wall termination point 82 and $m$ is the distance from edge point 16 to its nonconjugate wall termination point 83. Eq. 5 is a natural generalization of Eq. 2. To solve the asymmetric problem, we choose the profile curve of wall 76 so that singly reflected rays from point 14 form the caustic curve portion 64, as before. Similarly we choose the profile curve of wall 74 so that singly reflected rays from point 16 form the same caustic curve portion 64. Let us denote by $l$ and $r$ the optical path length from point 14 to wall 76, e.g. line 78, and of the reflected ray from wall 76 to the caustic curve portion 64, e.g. line 79, and let us denote by $l'$ and $r'$ the optical path length from point 16 to wall 74, e.g. line 80, and of the reflected ray from wall 74 to the caustic curve portion 64, e.g. line 81. Then, integrating along wall 76 (with point 16 as origin), we obtain $$S = \int_{pt.\ 68}^{pt.\ 83} d(l+r) = (q-p) + (r_{pt.\ 83} - r'_{pt.\ 82}) \qquad 6$$

Integrating along wall 74 (with point 14 as origin), we obtain $$S = \int_{pt.\ 72}^{pt.\ 82} d(l'+r') = (n-m) + (r'_{pt.\ 82} - r_{pt.\ 83}) \qquad 7$$

Therefore, adding Eqs. 6 and 7 we find $$S = \tfrac{1}{2}[(q-p)+(n-m)] \qquad 8$$

which is the maximal concentration condition required by Eq. 5. Thus the collector herein disclosed achieves maximal concentration of light from a source of finite dimension and finite distance from the collector.

Figure 3:
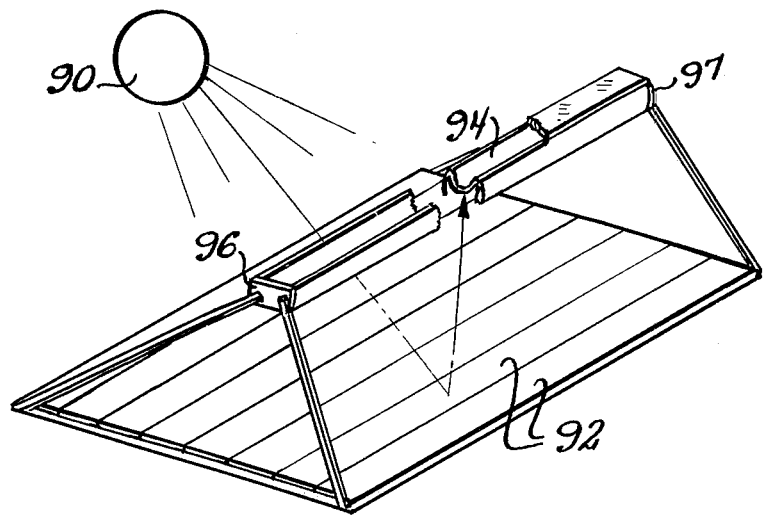
FIG. 3 shows the trough-shaped structure of this invention as utilized as a secondary collector.

An example of the practical application of the principles herein disclosed is shown in FIG. 3. Here the collector disclosed is used as a secondary collector. Energy from the sun 90 is initially collected by primary collector 92, which might be an array of mirrors. The energy incident on collector 92 is directed to the secondary collector 94. Collector 94 has a transverse cross section developed with respect to the edge points of primary source 92 and which is generated along an axis perpendicular to the cross section to form the trough-like or cylindrical collector. Flat reflective end walls 96 and 97 fully enclose the collector. Where, as in FIG. 3, the device is to collect solar radiation, the side walls have a reflecting material thereon which would reflect substantially all of the solar energy from primary collector 92, as, for example, aluminum or silver. Of course, the principles herein disclosed are applicable to any source of finite dimension and finite distance from the collector. Note further, that in practical application the collector side walls may be truncated so that they do not extend all the way to the tangent lines. However, the contour still will follow the definition herein disclosed.

While the invention has been described in detail as a collector and concentrator of energy and within an energy receiver, it is not limited to this form. Any electromagnetic energy transducer, receiver or transmitter can be used. Thus, if it is desired to transmit energy onto a finite area of finite distance from the transducer, an energy radiator could be substituted for the energy receiver.

The embodiments of the invention in which an exclusive property or privilege is claimed are defined as follows:

1. A device for concentrating energy from a source of radiant energy of finite dimension defined by first and second opposing edge points, comprising:

an energy transducer, a portion of whose cross section is bounded by a first reference axis with said portion and said first reference axis coplanar with a line coupling the edge points, the perimeter of said portion being convex and being limited to the same side of said first reference axis as the source, said portion having a second reference axis extending therethrough perpendicular to said first reference axis, the perimeter of said portion extending from a first tangent point along said first reference axis to a second tangent point along said first reference axis such that a first line from the first edge point to said first tangent point intersects said second reference axis and is tangent to the perimeter of said portion at said first tangent point and such that a second line from the second edge point to said second tangent point intersects said second reference axis and is tangent to the perimeter of said portion at said second tangent point, and a first side wall for directing radiant energy being positioned on the same side of said second reference axis as said first tangent point and being of such contour that any ray of radiant energy from the first edge point intersecting said second reference axis and incident on said first wall is directed along a line tangent to said portion, said first side wall extending from said first line to no further than a intersection with said second line.

2. The device of claim 1 wherein said energy transducer is an energy absorber.

3. The device of claim 2 wherein said first side wall terminates at said second line.

4. The device of claim 2 further including, a second side wall for directing radiant energy being positioned on the other side of said second reference axis from said first side wall substantially opposite said first side wall, said second wall being of such contour that any ray of energy from the second edge point intersecting said second reference axis is directed along a line tangent to said portion, said second side wall extending from said second line to no further than an intersection with said first line.

5. The device of claim 4 wherein said first and second side walls terminate at said second and first lines, respectively.

6. The device of claim 4 wherein said portion is symmetrically disposed wth respect to said source and the contour of said first side wall is a mirror image of the contour of said second wall.

7. The device of claim 4 wherein said energy absorber extends along a third reference axis perpendicular to said first and second reference axes, said first and second side walls also extending in the direction of said third axis and being parallel thereto to form a trough-like structure.

8. The device of claim 7 wherein said source is a primary solar energy collector and said device is positioned as a secondary collector to concentrate energy directed thereto by said primary collector.

* * * * *